June 12, 1973 R. K. ILER 3,738,957

COACERVATES OF POLYVINYL ALCOHOL AND COLLOIDAL SILICA

Filed March 18, 1971

INVENTOR
RALPH K. ILER

BY Paul R. Heyermark

ATTORNEY

United States Patent Office 3,738,957
Patented June 12, 1973

3,738,957
COACERVATES OF POLYVINYL ALCOHOL AND COLLOIDAL SILICA
Ralph K. Iler, Wilmington, Del., assignor to E. I. du Pont de Nemours and Company, Wilmington, Del.
Filed Mar. 18, 1971, Ser. No. 125,719
Int. Cl. C08f 45/04
U.S. Cl. 260—41 A                                   7 Claims

ABSTRACT OF THE DISCLOSURE

Coacervates of polyvinyl alcohol and colloidal silica having the average particle diameter of 4–50 nanometers are formed in good yields within the pH range of 1.5–4.5 and with the silica/polyvinyl alcohol ratio such that a monomolecular layer of polyvinyl alcohol can be formed on the silica surface. The concentration of polyvinyl alcohol is such that there are 1–5 alcoholic hydroxyl groups per square nanometer of silica surface. Such cocervates are useful as insolubilizers and extenders for polyvinyl acetate emulsions, as a source of fine silica powders that can be used as adsorbents for vapors or as a source of colloidal silica dispersible in water-miscible organic solvents.

BACKGROUND OF THE INVENTION

This invention relates to novel aqueous, acidic coacervates of polyvinyl alcohol (hereinafter, PVA) and colloidal silica.

A coacervate is defined as an aggregation of colloidal droplets immiscible with the liquid phase in which it is formed.

Aqueous solutions containing PVA and colloidal silica have been disclosed in the prior art. Thus, U.S. Pat. 2,833,661 (to Ralph K. Iler) discloses the use of a PVA solution containing an alkali-stabilized colloidal silica as a binder for clay in paper coatings. This reference is not concerned with acidic solutions of colloidal silica and PVA, nor does it mention any coacervate formation. Although PVA and colloidal silica are generally compatible in an alkaline medium, above a certain critical concentration, the colloidal silica separates as a heavy, concentrated sol containing very little PVA. This phase separation occurs only at high concentrations of silica, e.g. 20% $SiO_2$. The $SiO_2$ phase contains very little PVA, e.g. 30% $SiO_2$ and 0.4% PVA, and is not a coacervate.

SUMMARY OF THE INVENTION

According to the present invention, it has now been discovered that a coacervate forms as a separate liquid phase in an aqueous solution containing PVA and colloidal silica under certain critical conditions which include the particle size of colloidal silica, the ratio of PVA to colloidal silica, the concentrations of the compositions, and the pH of the mixture.

In particular, the colloidal silica has the average particle diameter of 4–50 nanometers, corresponding to specific surface areas of about 700–56 square meters per gram of $SiO_2$. One nanometer (1 nm.) is the equivalent of $10^{-9}$ m. and is equal to one millimicron (1 m$\mu$), which has been for many years used by scientists. The term "nanometer" is now the recognized scientific unit and will be used in this application.

The ratio of PVA to colloidal silica is such that there are 1–5 alcoholic hydroxyl groups per square nanometer of colloidal silica surface. The pH is between about 1.5 and 4.5.

DRAWING

Figure 1:
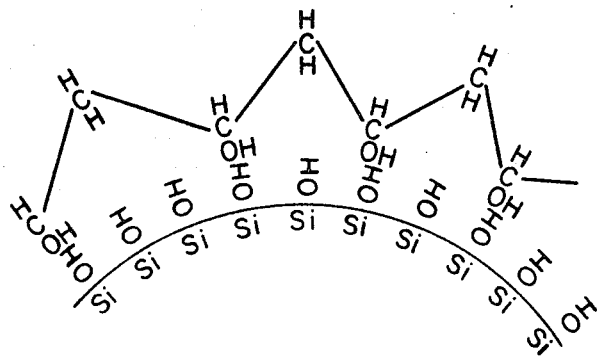
Figure 2:
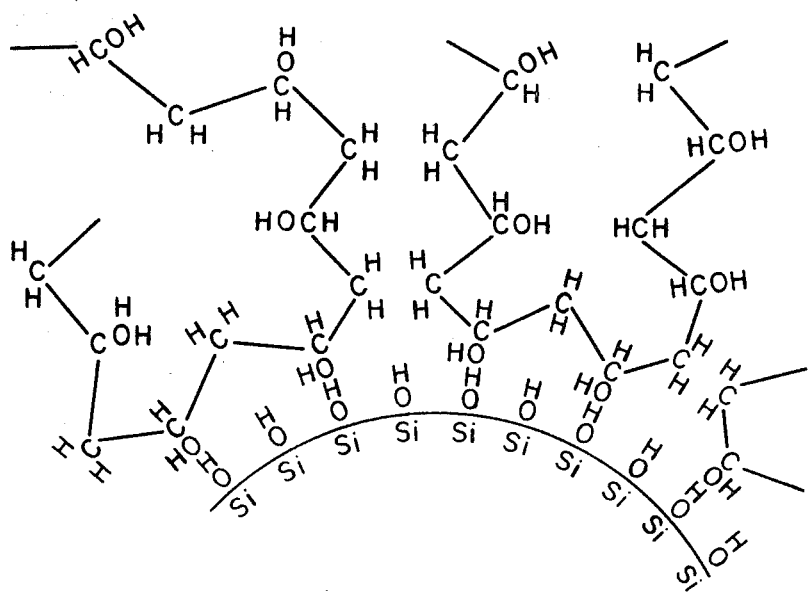

The drawing represents a schematic picture of a silica molecule with polyvinyl alcohol molecules hydrogen-bonded to it. FIG. 1 represents a hydrophobic system, while FIG. 2 represents a hydrophilic system.

DETAILED DESCRIPTION OF THE INVENTION

Although no scientific theory of coacervate formation from PVA and silica is proposed, the coacervate is believed to be created by a hydrogen-bonded association between the hydroxyl groups of polyvinyl alcohol and the surface of colloidal particles. The association of polar compounds of relatively low molecular weights with polysilicic acid, with formation of hydrogen-bonded complexes as separate liquid phases, has been previously reported, cf. page 59 of "The Colloid Chemistry of Silica and Silicates" by R. K. Iler (Cornell University Press, 1955). These complexes involve an oriented adsorption through hydrogen bonds of polar groups in the organic compound and the SiOH groups of the silica in the polysilicic acid solution.

The surface of particles of colloidal silica is made up of silanol (—SiOH) groups; thus the surface acts as a polysilicic acid and can similarly form hydrogen-bonded complexes. Yet, no hydrogen-bonded complexes were reported in the case of high molecular weight hydroxylated polymers such as PVA, cf. "Association Between Polysilicic Acid and Polar Organic Chemicals," by R. K. Iler, J. Phys. Chem. 56, 673–677 (1952).

Unlike the hydrogen-bonded compositions of the prior art, where an excess of either component does not prevent the separation of a phase containing both silica and the organic compound, PVA associates with colloidal silica and forms a separate coacervate phase only where present in critical proportions. It has been found that the coacervate consists primarily of silica particles associated with an amount of polyvinyl alcohol sufficient to cover the surface of the silica particles as a monomolecular layer. If much less or much more polyvinyl alcohol is present than required to form a monomolecular layer on the surface of the silica particles, a coacervate liquid does not separate from the aqueous mixture. The optimum yield of coacervate is formed when there is present only the amount of polyvinyl alcohol required to form an adsorbed monomolecular layer on the silica surface. With less polyvinyl alcohol or more polyvinyl alcohol, some coacervate is obtained, but in considerably smaller yield.

It appears that when there is present in an acidic mixture an amount of polyvinyl alcohol such that it is just sufficient to form a monomolecular adsorbed layer on the surface of all the silica particles present, the coated particles become hydrophobic, i.e. not as compatible with water as are uncoated silica particles. Such coated particles can be schematically represented as shown in FIG. 1.

When an excess of PVA is present, the coated silica particle is no longer hydrophobic, as shown in FIG. 2.

With an insufficient amount of PVA, there will be an excess of hydrophilic silanol groups, SiOH, present on the particle surface.

While the pH range of 1.5–4.5 is operable, it is preferred to maintain the range of 2–4. At a pH higher than 4.5, and especially within the range of about 5–6, colloidal silica has a tendency to gel relatively rapidly. Below the pH of 1.5 the composition is considerably more corrosive to equipment. Since much more acid also is required to attain such low pH values and little gain in stability is achieved, operation below pH of 1.5 is undesirable. A pH of about 2.5 is particularly preferred.

As stated above, the average particle size of colloidal silica which can be used in the process of this invention is 4–50 nm. Best results are obtained with silica having the average particle size of 4–25 nm. The average particle size of the colloidal silica can be calculated from the specific surface area as determined by the titration method of Sears, Anal. Chem. 28, 1981 (1956). Another, less preferred, surface area determination has been reported in U.S. 2,750,345 (to G. B. Alexander), col. 6, lines 29–66. The particle diameter in nanometers equals 2750 divided by the specific surface area of the silica in square meters per gram. Thus, particles having a specific surface area of 275 m.²/g. will have an average particle diameter of about 10 nanometers.

The starting colloidal silica can be any alkali stabilized silica sol within the above particle size range. Several commercial silica sols of varying concentrations and particle sizes are available under such trade names as Ludox® (Du Pont Co.), Nalcoag® (Nalco Chem. Co.), and Syton® (Monsanto Co.). The alkali present as stabilizer is removed by ion exchange or neutralized either prior to or after admixture with the PVA to a pH of 4.5 or less.

PVA is made by hydrolysis of polyvinyl acetate by methods well known to the art.

Polyvinyl alcohols of different molecular weights can be employed, but in general, those are preferred which have a viscosity of from about 5 to 150 cps. as measured in a 4% aqueous solution at 20° C. by the Hoeppler falling ball method, as described in "Introduction to Colloid Chemistry" by K. J. Mysels, pages 256–257 (Interscience Publishers, Inc., New York, N.Y., 1959). Because of the difficulty of dissolving the highest molecular weight, highly viscous material, it is generally preferred to use polyvinyl alcohols having viscosities, as defined, in the range from about 5 to 60. The degree of hydrolysis should be such that the hydrolyzed polyvinyl acetate is soluble in water; preferred polymers are those in which from 85 to 100% of the polyvinyl acetate groups have been replaced by hydroxyl groups. The most preferred PVA is a polymer in which at least 98% of the acetate groups have been hydrolyzed to hydroxyl groups. Incompletely hydrolyzed polymers containing more acetate groups and fewer hydroxyl groups will require a somewhat higher ratio of polyvinyl alcohol to silica of a given particle size for maximum yield of coacervate.

The components, PVA and colloidal silica, are generally made up separately as stable aqueous solutions. Thus the polyvinyl alcohols, which often contain small amounts of sodium acetate, will be weakly alkaline and can be made up as a 5 to 15% aqueous solution by stirring the polymer powder in cold water and then heating with stirring at about 80 to 100° C. until a clear solution is obtained.

The colloidal silica solution, which contains from about 10 percent or less to 50 percent of silica by weight, can be diluted first or admixed directly into the PVA solution. The mixture should then be cooled to less than 40° C. to avoid gelation in the next step.

An acid is then added to lower the pH of the mixture to less than about 4.5, for example, from 2 to 3.5. The coacervate will separate, provided the mixture is cooler than 40° C. or so, first as a cloudy haze throughout the solution, and thereafter gathering together into droplets which settle to a viscous liquid mass.

An alternative procedure is to acidify the colloidal silica sol to below a pH of 4.5 and then mix it with the PVA solution. Acids such as acetic, formic, phosphoric, sulfuric, nitric, or hydrochloric can be employed, or the pH of the silica sol may be lowered by stirring into it the hydrogen form of a sulfonic acid ion exchange resin which is then filtered out after the pH has been lowered. If the pH is about 2.5, the acidified mixture of silica and polyvinyl alcohol can be stirred and warmed to 40° C. to obtain a homogeneous liquid and then gradually permitted to cool, whereupon the coacervate separates. Generally speaking, however, it is preferable not to heat either the acidified silica sol or the acidified mixture, especially in the case of silica particles of particle size less than 10 nanometers, and especially if the pH is between 3 and 5. More acidic solutions can be heated for a short time and then cooled to bring about the separation of the coacervate as uniform droplets.

Aging the sol, especially at a pH of about 5, or heating an acid solution of colloidal silica prior to mixing with PVA is undesirable because either solid gel formation or emulsification of colloidal silica may occur.

Relationship between the optimum $SiO_2$/PVA ratio and the $SiO_2$ particle size If R is the optimum weight ratio of $SiO_2$/PVA for maximum yield of silica in the coacervate, and D is the $SiO_2$ particle diameter in nanometers, it can be shown experimentally that $R:D$ is a relatively constant value, approximately equal to 2. The optimum amount of PVA per gram of silica is $1/R$. The molecular weight of one hydroxylated segment of PVA, —CHOH—$CH_2$—, is 44. Thus, the area of one gram of amorphous silica having a particle diameter of D nm. is 2750/D m.², or $2.75 \times 10^{21}$/D nm.², calculated from the geometry of a spherical particle and the $SiO_2$ density which is 2.2 g./cm.².

The number of PVA groups per nm.² of $SiO_2$ is $$\frac{1}{R} \times \frac{6 \times 10^{23}}{44} \times \frac{D}{2.75 \times 10^{21}} = 5 \frac{D}{R}$$

Thus, since $R/D$ is about 2, there are about 2.5 alcoholic hydroxyl groups per nm.² of silica surface. Although lower yields of coacervate are obtained with lower or higher $SiO_2$/PVA ratios, the invention is operable within the range of 1–5 alcoholic hydroxyl groups per square nanometer of silica surface.

This invention is now illustrated by the following examples of certain representative embodiments thereof, where all parts, proportions, and percentages are by weight unless otherwise indicated. Where both parts by weight and parts by volume are used in an example, one part by volume bears the same relationship to one part by weight as one liter does to one kilogram.

Example 1

As an example of a coacervate prepared from colloidal silica having a particle size averaging 14 nm. and a polyvinyl alcohol of intermediate viscosity, one employs alkali-stabilized silica sol containing 30 grams of $SiO_2$ per 100 mls. of volume, stabilized with an amount of alkali such that there are present 94 parts of $SiO_2$ per 1 part of $Na_2O$, and a polyvinyl alcohol prepared by hydrolyzing 98% of the acetate from polyvinyl acetate and having a molecular weight such that in a 4% aqueous solution at 20° C., the viscosity is 60 cps. as determined by the Hoeppler falling ball method. The PVA powder is dissolved by stirring 10 parts in 90 parts of cold water and heating with stirring to a temperature of 90° C. at which point a clear, viscous solution is obtained.

Fifty parts by volume of the silica sol containing 15 parts by weight of silica are diluted with 37 parts by volume of water; 10 parts by volume of the 10% solution containing one part of PVA is added and the mixture throughly blended with a high speed propeller at ordinary temperature. Then, three parts by volume of 2-normal nitric acid are added to reduce the pH of the mixture to about 2. To facilitate the separation of the coacervate, entrapped air is removed by adding to the mixture 0.05% of normal octyl alcohol as a defoaming agent, and subjecting the mixture to a sufficient vacuum. The acidified mixture is then transferred to a settling vessel and after one-half hour the lower viscous layer of coacervate is removed. From 105 parts of the mixture there are recovered 23 parts of coacervate which, as determined by drying a sample at 95° C., contains 10 parts of solids, of which 93% consists of silica. The solids contain 2.19% by weight of carbon, corresponding to 4.1% by weight of polyvinyl alcohol; the remainder of the solid consists of bound water.

Example 2

Whereas in Example 1 there were present in the initial mixture 15 parts of $SiO_2$ per one part of PVA, in the present example the starting mixture contains 30 parts of $SiO_2$ per part of PVA. Thus, 50 parts by volume of the 14 nm. colloidal silica sol employed in Example 1, containing 30 grams of silica per 100 milliliters, is diluted with 42 parts by volume of water and mixed with 5 parts by volume of the 10% PVA solution of Example 1 and, after thorough blending, is acidified by adding 3 parts by volume of 2 N nitric acid. From 106 parts of the resulting mixture, there is separated 21 parts of coacervate containing 9.9 parts of solids, of which 94.7% is silica. The solids contain 1.67% of carbon, corresponding to 3.1% of PVA. The remaining 2.2% of the solids unaccounted for is mainly adsorbed or bound water, including the water bound as silanol (SiOH) groups on the surface of the colloidal silica particles.

Example 3

In this example, a coacervate is prepared with smaller particles of colloidal silica, namely, averaging about 8 nm. in diameter. The silica sol contains 30 grams of silica per 100 milliliters and is stabilized with alkali to a pH of about 10. The PVA is a medium viscosity polymer, such as is used in Examples 1 and 2, and has a viscosity of 60 cps. in 4% aqueous solution. Fifty parts by volume of the 30 percent silica sol containing 15 parts of silica are mixed with 30 parts by volume of water and 15 parts by volume of 10% polyvinyl alcohol solution containing 1.5 parts of PVA acidified with 5 parts by volume of 2 N nitric acid, deaerated and allowed to stand to allow the lower layer of coacervate to separate. One hundred and seven parts by weight of the overall mixture gives 39 parts of liquid coacervate, which contains 14.15 parts of solids, of which 91.1% is silica, and 6.7% is PVA, calculated from a carbon content of 3.56%. The remainder of the dried solids is mainly bound water.

Example 4

To prepare a coacervate from a high molecular weight PVA with 14 nm. colloidal silica, one uses a PVA made by hydrolyzing 97% of the acetate groups from polyvinyl acetate, and having a molecular weight such that the viscosity of a 4% solution at 20° C. is 125 cps. Following the procedure of Example 1, a mixture is prepared containing 5% silica and 0.25% PVA at a pH of 2, from which an oily coacervate separates at room temperature. This coacervate contains 68% of the silica in the overall mixture; and, when it is dried, the resulting solid contains 93.5% silica, as determined by the weight of ash.

Example 5

A coacervate is prepared from 14 nm. colloidal silica and a low molecular weight PVA, the latter being prepared by essentially completely hydrolyzing polyvinyl acetate, the PVA having such a low molecular weight that a 4% solution at 20° C. has a viscosity of only 5 cps. A mixture containing 5% of silica and 0.85% of the low molecular weight PVA, and having a pH of 2 is prepared following the general method described in Example 1. After the mixture is homogenized and allowed to stand, there separates a liquid coacervate containing 17.7% of the silica in the overall mixture. The dried coacervate contains 89% of silica.

Example 6

A coacervate containing very small silica particles of high specific surface area and containing a high percentage of PVA is prepared from an alkali-stabilized silica sol having particles about 4 nm. in diameter, with a specific surface area of between 600 and 700 m.²/g. and containing 16 grams of silica per 100 milliliters. A PVA of medium molecular weight is employed; it is prepared by hydrolyzing 99% of the acetate groups from polyvinyl acetate and has a molecular weight such that a 4% PVA solution at 20° C. has a viscosity of 30 cps. A mixture is prepared using 62.5 volumes of the 4 nm. sol, 15 volumes of water and 16.6 volumes of a 10% solution of the polyvinyl alochol; the pH is adjusted to 2 by adding 6 volumes of 2 N nitric acid. The mixture thus contains 10% of silica and 1.66% of PVA. After being thoroughly blended, and standing for 3 minutes, the mixture separates into two liquid layers. After deaerating and allowing to settle for one hour, one recovers the lower liquid layer having the appearance of an oily precipitate. Thirty-seven parts of the lower liquid coacervate are obtained from 105 parts of mixture, and the coacervate contains 9.9 parts of solids, of which 86.5% is silica and 11% is PVA. The major remaining component is water, bound in the air-dried solid. The coacervate is converted to an extremely porous silica gel by drying it at room temperature and heating it in air at about 500° C. until the silica residue is colorless.

Example 7

As an example of a coacervate containing relatively large silica particles and a very low content of PVA, a mixture is prepared by the general procedure described in Example 1, using 50 nm. silica particles and PVA having a viscosity of 60 cps. in 4% solution; the mixture contains 5% silica and only 0.10% PVA and has a pH of 2. The coacervate separating from the mixture contains over 10% of the silica in the mixture, and the dried coacervate contains 98% of $SiO_2$ and less than 1% of polyvinyl alcohol. The undried coacervate is readily dissolved in isopropyl alcohol, giving a slightly opalescent solution containing 1% $SiO_2$, which is sprayed on paper to increase the coefficient of friction.

Example 8

This example shows that there is an optimum ratio of $SiO_2$ to PVA, as related to the particle size of the silica, at which a maximum proportion of the total silica in the mixture is recovered in the coavervate. Thus, a series of mixtures is prepared by the general procedure of Example 6, using a sol of 4 nm. colloidal silica particles, the mixtures all containing 5% of silica and varying proportions of a medium molecular weight PVA, all adjusted to pH 2. A 4% PVA aqueous solution at 20° C. has a viscosity of 30 cps. The mixtures are deaerated and the coacervates recovered, weighed and analyzed for silica. The following results are obtained:

| Wt. ratio $SiO_2$/PVA: | Percent recovery of silica in coacervate |
|---|---|
| 3.0 | 72 |
| 4.0 | 80 |
| 6.0 | 86 |
| 10.0 | 80 |
| 15.0 | 73 |

The optimum $SiO_2$/PVA ratio in these experiments is 6.0.

Example 9

In the same manner as described in Example 8, the relationship between the ratio of $SiO_2$ to PVA and the percentage recovery of the silica in the coacervate phase is shown for silica particles 8 to 9 nm. in diameter. The type of PVA, pH and other conditions are the same as in Example 8. The results are presented below:

| Wt. ratio $SiO_2$/PVA: | Percent recovery of silica in coacervate |
|---|---|
| 5.0 | 30 |
| 7.5 | 80 |
| 10.0 | 88 |
| 12.5 | 85 |
| 15.0 | 80 |

| Wt. ratio SiO$_2$/PVA: | Percent recovery of silica in coacervate |
|---|---|
| 20.0 | 71 |
| 30.0 | 56 |

In this case, the optimum SiO$_2$/PVA ratio is 10.0.

Example 10

In this example it is shown that the optimum ratio of silica to PVA in the mixture for maximum recovery of silica in the coacervate is relatively independent of the molecular weight of the PVA. In this example, mixtures are prepared in the manner described in Example 9, using PVA of a higher molecular weight than in Example 9. The PVA is a 98% hydrolyzed polyvinyl acetate and has a viscosity of 60 cps. in a 4% solution at 20° C. This is in contrast to the 30 cps. viscosity of the PVA used in Example 9.

The following results are obtained:

| Ratio SiO$_2$/PVA: | Percent recovery of silica in coacervate |
|---|---|
| 5.0 | 50 |
| 7.5 | 68 |
| 10.0 | 86 |
| 15.0 | 84 |
| 25.0 | 74 |

It will be noted that the optimum yield is obtained at a 10:1 weight ratio of SiO$_2$ to PVA, as in Example 9, even though a PVA of twice the viscosity is employed.

A coacervate of this invention can be employed as an insolubilizer and extending medium for polyvinyl acetate emulsions. The incorporation of the coacervate, which has a high silica content, increases the hardness and modulus of films cast from such emulsions.

White, opaque, highly porous silica gels are prepared by drying the coacervate and then heating the solid residue in air at about 500° C., to oxidize the organic components. In the absence of the PVA, colloidal silica prepared under similar conditions by drying at low pH forms silica gel which under the microscope appears to consist of clear, glassy fragments. The same colloidal silica combined with PVA as a coacervate, dried and heated under the same conditions, gives granules which are white and opaque due to the pores left after the PVA is oxidized away. The structure formed by drying the coacervate may vary to some extent depending on the drying temperature. Thus, a more heterogeneous structure results from drying above about 50–60° C. than at room temperature. The residual silica made from a coacervate is highly porous and contains many pores larger than 0.1 nm. in diameter; which cause the gel to appear white and opaque; such gel is much more readily crushed and ground to a finer silica powder than conventional silica gel made by drying the same silica sol alone. Such fine silica powders are useful as vapor adsorbents.

The coacervates of the present invention also provide a convenient source of colloidal silica dispersible in water-miscible organic solvents such as methanol, ethanol, propanol, and acetone. Thus, colloidal silica can be concentrated from a 10% aqueous sol by forming a coacervate with PVA which may contain up to 40% silica. This coacervate can then be dissolved in alcohol, forming an organosol. Such organosols can be used for applying antislip coatings to surfaces such as plastics and metals.

Furthermore, these coacervates can be used as emulsifiers in the emulsion polymerization of methyl methacrylate at ordinary temperature, using a benzoyl peroxide catalyst and ultraviolet light. The use of a coacervate of two organic water-soluble polymers for emulsion polymerization is described by J. M. Church, Society of Plastics Engineers, Technical Papers, vol. 16, pages 53–55, 1970.

The coacervates of the present invention consist predominantly of silica, and their use in emulsion polymerization introduces a minimum of water-sensitive organic polymeric material into the methyl methacrylate polymer.

A coacervate of this invention can be converted to a concentrated liquid dispersion of colloidal silica containing the polyvinyl alcohol by adding a minor proportion of an alcohol such as normal propyl alcohol and agitating the mixture vigorously. A coacervate which forms as a viscoelastic white mass, when blended with 10% of its weight of normal propyl alcohol, is converted to a slightly viscous, clear liquid with excellent wetting and spreading properties for depositing a thin layer of silica on porous surfaces such as paper. This material, when dry, gives a smooth, varnish-like coating resistant to pencil marks and soiling. The coating is water-resistant and insoluble in organic solvents.

The coacervates of the present invention, especially those of high silica content, are useful for making silica gel of unusually high porosity and high specific surface area. The specific surface area of silica gel is of importance in uses such as adsorbents and as catalyst supports. This is discussed by Vail, on page 579, volume 2, of "Soluble Silicates," Reinhold Publishing Co., N.Y. 1952. Attempts to improve the porosity and surface area of gels are discussed, starting on page 550. As stated on page 570, "Silica gels of increased porosity can be made by gelling mixtures containing substantial quantities of ingredients which may be later removed by extraction with acid or with water." In the present invention, the extremely uniform distribution of the PVA molecules around the individual silica particles in the coacervate provides a particle to particle separation of only a few angstroms, and when the PVA is removed, leaves pores of small uniform size and provides silica gel of high specific surface area because the silica surfaces remain separated.

The utility of the coacervates of the present invention is further illustrated by the following Examples 11–13, wherein the meaning of proportions, percentages, parts, parts by weight, and parts by volume is the same as in the preceding Examples 1–10.

Example 11

As an example of the use of a coacervate of this invention for emulsion polymerization of methyl methacrylate, a coacervate is made by mixing 60 parts of a 10% aqueous solution of polyvinyl alcohol, the PVA being 99.8% hydrolyzed polyvinyl acetate and having a viscosity of 60 cps., 440 parts of water and 500 parts of a 30% sol of colloidal silica, having the average particle size of 14 nanometers and a pH of 10. The solutions are thoroughly mixed, and 12 parts of a hydrochloric acid solution containing 14.5% hydrogen chloride is added to lower the pH of the mixture to 2.3. The white, foamy mass is warmed to 30° C. and placed in a deaerating chamber; then, 0.5 part of dodecyl alcohol and 5 parts of normal propyl alcohol are added to destroy the foam, and the deaerating chamber is evacuated. After foaming ceases under vacuum, the liquid is left under vacuum sufficient to cause slow boiling for one half hour, thus reducing the temperature to 25° C. The liquid is poured into a separating tank and permitted to stand for 16 hours. A visco-elastic, white coacervate (238 parts) separates. This is blended with 360 parts of water, and again the coacervate is permitted to separate and is recovered unchanged in appearance.

Analysis of a sample of the wet coacervate by drying at 100° C. in air, shows that it contains 44.5% by weight of solids. Chemical analysis shows that it contains 41% by weight of silica, so that the silica content of the dried solids in the coacervate is 92.5%.

Methyl methacrylate is emulsion-polymerized by placing 100 parts of monomeric methyl methacrylate in a reaction vessel fitted with an internal ultraviolet light, along with 300 parts of water and 4.5 parts of the undried coacervate, along with 0.5 part of benzoyl peroxide. The mixture is stirred for 2.3 hours while maintaining temperature at between 25 and 31° C. There is obtained a milk-white emulsion of poly(methyl methacrylate) containing particles in suspension that are 1 to 5 microns in diameter. The emulsion dries to a fine, white powder, which can be used for making molded objects by adding monomeric methyl methacrylate to form a plastic mass, molding, and hardening.

When methyl methacrylate is emulsion-polymerized under the same conditions using 4.5 parts of a 10% solution of the polyvinyl alcohol as emulsifying agent instead of the coacervate, most of the polymer is present as undispersed masses; only a minor fraction is present in the form of suspended particles. The air-dried reaction mixture is obtained as a coherent, crusty mass.

Example 12

As an example of coating paper with a liquid dispersion of coacervate, 64 parts of the white visco-elastic coacervate of Example 11 is blended with 6 parts of normal propyl alcohol, resulting in a clear, viscous solution containing about 35% silica. This is coated as a thin layer on white paper to give a smooth finish that does not take pencil marks, and is repellent to dirt. This film is not penetrated by solvent-based ink such as is commonly used in marking pens; the ink marks the coated surface easily, but the mark is removed by an eraser, whereas marks on the uncoated paper are not removable. The solvent-based ink strikes through the uncoated paper, but not through the coated paper.

Example 13

This is an example of making silica gel of high specific surface area by first forming and drying a coacervate from polyvinyl alcohol and colloidal silica, and then removing the polyvinyl alcohol from the silica gel structure. The coacervate is prepared from a colloidal silica having an average particle diameter of 5 nanometers, and polyvinyl alcohol having a characteristic viscosity of 30 cps.

Eighty-three parts by volume of a 10% solution of the polyvinyl alcohol are mixed with 75 parts by volume of water, and 312 parts by volume of the silica sol containing 16 grams of silica per 100 mls. is added. After the mixture has been blended, the pH is adjusted by adding 36 parts by volume of 12% nitric acid to give a pH of 2. The mixture is deaerated and permitted to stand for 10 minutes, in which time a heavy lower liquid of coacervate separates. The upper aqueous phase is decanted off, and 50 parts by volume of water are added to the coacervate, stirred and permitted to settle, and the wash water is decanted off. This is done twice. The oily coacervate liquid is air-dried.

For comparison, a mixture of colloidal silica, water and nitric acid made up in the same proportions as above but without the polyvinyl alcohol, is also air-dried in the same manner. This provides unmodified silica gel.

A portion of the coacervate is placed in a muffle furnace and heated in air at 475° C. until the dark carbonaceous content is oxidized and the residue is colorless. Another portion of the dried coacervate is placed in 70% nitric acid and heated for 18 hours to dissolve and oxidize the polyvinyl alcohol, leaving the silica gel. The resulting silica gel is washed with water until free from acid and dried at 150° C. For comparison, the silica gel obtained from the silica sol without forming a coacervate with PVA is heated in the same way at 475° C. in air, and another proportion is treated with nitric acid, washed and dried in air at 150° C.

The specific surface areas of the resulting silica gel powders are determined by the nitrogen adsorption method. The silica from the coacervate from which the PVA has been removed by heating at 475° C. has a specific surface area of 431 m.$^2$/g., whereas the corresponding silica gel control made without PVA has a specific surface area of 209 m.$^2$/g. The silica gel powder made by removing the coacervate from the silica gel with nitric acid and drying at 150° C., has a specific surface area of 579 m.$^2$/g., whereas the silica control prepared from the same sol without PVA and similarly processed, has a specific surface area of 481 m.$^2$/g.

A silica gel prepared from the above coacervate by heating in air slowly to 600° C. is compared with the corresponding silica gel made without PVA but similarly heated, by using the gels for drying air to a relative humidity of 81%. At this humidity, the silica made from the coacervate absorbs 20.0% by weight of moisture, whereas the control gel absorbs only 10.2%. The silica made from the coacervate has a specific surface area of 179 m.$^2$/g., while the control gel has a specific surface area of only 47 m.$^2$/g.

I claim:

1. A coacervate of polyvinyl alcohol and colloidal silica, said silica having the average particle diameter of 4–50 nanometers, said polyvinyl alcohol having a viscosity of from about 5–150 cps. as measured in a 4% aqueous solution at 20° C. by the Hoeppler falling ball method and having a degree of hydrolysis such that from 85–100% of the polyvinyl acetate groups have been replaced by hydroxyl groups, and the ratio of said silica to said polyvinyl alcohol being such that there are from 1–5 alcoholic hydroxyl groups per square nanometer of colloidal silica surface.

2. A coacervate of claim 1 wherein the average particle diameter of silica is 4–25 nanometers.

3. A coacervate of claim 1 wherein the ratio of the silica to the polyvinyl alcohol is such that there are about 2.5 alcoholic hydroxyl groups per square nanometer of colloidal silica surface.

4. A method of making a coacervate of polyvinyl alcohol and colloidal silica, said silica having the average particle diameter of 4–50 nanometers, said method comprising the following steps:
   (a) preparing a clear solution of polyvinyl alcohol in water and maintaining it in the range of about 80–100° C., said polyvinyl alcohol having a viscosity of from about 5–150 cps. as measured in a 4% aqueous solution at 20° C. by the Hoeppler falling ball method and having a degree of hydrolysis such that from 85–100% of the polyvinyl acetate groups have been replaced by hydroxyl groups;
   (b) admixing the above polyvinyl alcohol solution with a colloidal silica solution in water, said silica having the average particle diameter of 4–50 nanometers, while maintaining the temperature above about 40° C., the ratio of said silica to said polyvinyl alcohol being such that there are about 1–5 alcoholic hydroxyl groups per square nanometer of said silica surface;
   (c) lowering the pH of the mixture to less than about 4.5; and
   (d) allowing the mixture to cool below about 40° C., thereby causing the separation of the coacervate.

5. A method of claim 4 wherein the silica has the average particle diameter of 4–25 nanometers.

6. A method of making a coacervate of polyvinyl alcohol and colloidal silica, said silica having the average particle diameter of 4–50 nanometers, said method comprising the following steps:
   (a) preparing a clear solution of polyvinyl alcohol in water, said polyvinyl alcohol having a viscosity of from about 5–150 cps. as measured in a 4% aqueous solution at 20° C. by the Hoeppler falling ball method and having a degree of hydrolysis such that from 85–100% of the polyvinyl acetate groups have been replaced by hydroxyl groups;

(b) admixing the above polyvinyl alcohol solution with a colloidal silica solution in water having a pH of about 2.5, said silica having the average particle diameter of 4–50 nanometers, the ratio of said silica to said polyvinyl alcohol being such that there are 1–5 alcoholic hydroxyl groups per square nanometer of said silica surface;

(c) heating the mixture with stirring to about 40° C. thereby causing a homogeneous liquid to form; and (d) cooling the liquid below about 40° C., thereby causing the separation of the coacervate.

7. A method of claim 6 wherein the silica has the average particle diameter of 4–25 nanometers.

References Cited

UNITED STATES PATENTS

| | | | |
|---|---|---|---|
| 3,277,041 | 10/1966 | Sieg et al. | 260—41 A |
| 3,301,701 | 1/1967 | Baker et al. | 23—182 R |
| 3,458,328 | 7/1969 | Zola | 260—29.6 WA |
| 3,629,140 | 12/1971 | Bayless et al. | 252—316 |

ALLAN LIEBERMAN, Primary Examiner

U.S. Cl. X.R.

252—313 S, 316, 317